(12) United States Patent
Fotedar

(10) Patent No.: US 7,009,974 B1
(45) Date of Patent: Mar. 7, 2006

(54) METHOD AND APPARATUS FOR UPDATING ADDRESSES IN NETWORK PROCESSING DEVICE

(75) Inventor: Shivi Fotedar, San Jose, CA (US)

(73) Assignee: Force10 Networks, Inc., Milpitas, CA (US)

( * ) Notice: Subject to any disclaimer, the term of this patent is extended or adjusted under 35 U.S.C. 154(b) by 846 days.

(21) Appl. No.: 09/837,896

(22) Filed: Apr. 18, 2001

(51) Int. Cl.
*H04L 12/28* (2006.01)

(52) U.S. Cl. ............ 370/392; 370/395.31; 370/395.54; 370/395.6; 370/396; 370/397; 370/466; 370/467

(58) Field of Classification Search ................. 370/392, 370/396, 397, 395.31, 395.54, 401, 359, 370/395.6, 466, 467
See application file for complete search history.

(56) References Cited

U.S. PATENT DOCUMENTS

| | | | |
|---|---|---|---|
| 5,790,546 A * | 8/1998 | Dobbins et al. |
| 5,818,842 A * | 10/1998 | Burwell et al. |
| 6,192,051 B1 * | 2/2001 | Lipman et al. |
| 6,650,646 B1 * | 11/2003 | Galway et al. |
| 6,751,191 B1 * | 6/2004 | Kanekar et al. |
| 6,789,118 B1 * | 9/2004 | Rao |
| 2002/0107908 A1 * | 8/2002 | Dharanikota |

* cited by examiner

*Primary Examiner*—Wellington Chin
*Assistant Examiner*—Kevin Mew
(74) *Attorney, Agent, or Firm*—Haynes and Boone, LLP

(57) ABSTRACT

A network processing device includes multiple control processors or applications. One or more of the multiple processors generates an address resolution request. A network interface is adapted to detect a reply to the address resolution request and broadcast the detected address resolution reply to the multiple control processors in the network processing device.

19 Claims, 4 Drawing Sheets

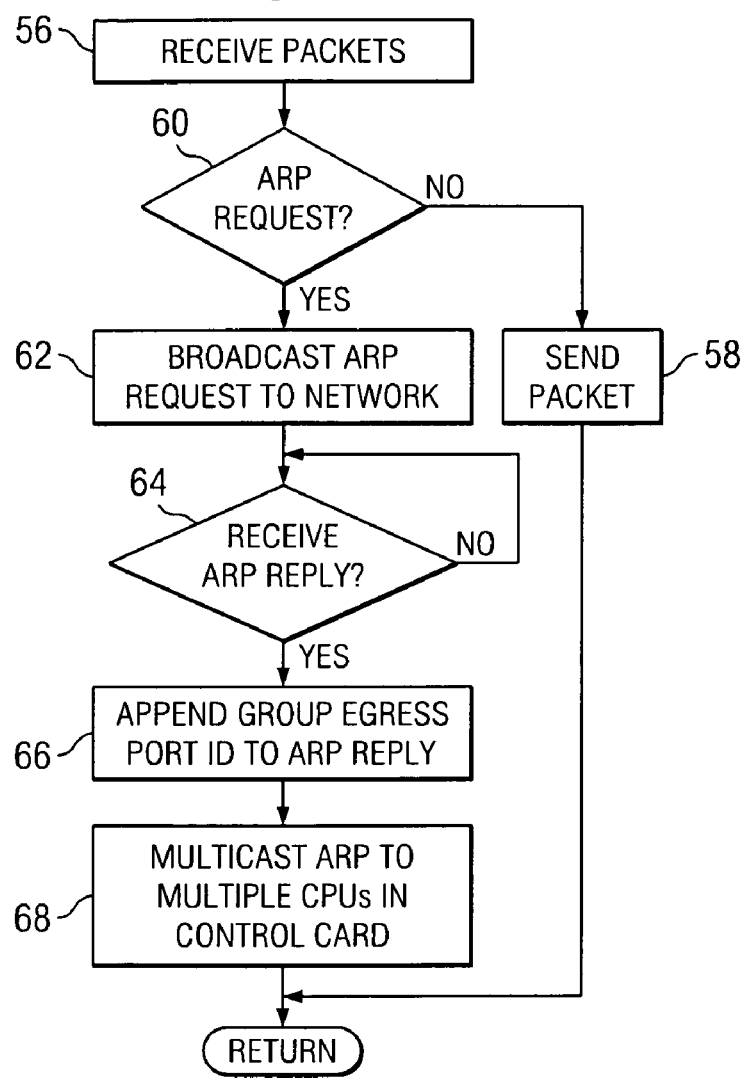

METHOD AND APPARATUS FOR UPDATING ADDRESSES IN NETWORK PROCESSING DEVICE

BACKGROUND

Network processing devices, such as routers and switches, include multiple ports that are connected to different communication lines. Data packets are received on these ports and sent through a switch fabric to output ports. Certain control packets are sent through the switch fabric to a controller in the packet processing device. The controller uses the control packets to control packet processing and exchange information with other network processing devices in the network.

The controller may require both an Internet Protocol (IP) address and an associated Media Access Control (MAC) address for routing packets to the correct destination points. If the controller does not have the MAC addresses for an IP packet to be forwarded or an IP packet it wants to send out, an address request is broadcast over the network using an Address Resolution Protocol (ARP). The ARP request includes the IP address for the requested MAC address.

The endpoint associated with that destination IP address receives the ARP request and sends back an ARP reply containing its MAC address. After receiving the ARP reply, the controller in the network processing device updates a table that associates the IP address with the MAC address.

A substantial amount of network resources and network bandwidth is used when ARP requests are broadcast over the network. The network processing device may have multiple processors or applications that each need to identify both IP addresses and their associated MAC addresses. Additional network resources and bandwidth are used when each of these multiple processors or applications in the same network processing device separately broadcast ARP requests and receive ARP replies over the network.

The present invention addresses this and other problems associated with the prior art.

SUMMARY OF THE INVENTION

A network processing device includes multiple processors or applications. One or more of the multiple processors generates an address resolution request. A network interface is adapted to detect a reply to the address resolution request and broadcast the detected address resolution reply to the multiple processors in the network processing device.

BRIEF DESCRIPTION OF THE DRAWINGS

FIG. 4 is a flow diagram describing how a line card multicasts an address resolution rely to multiple CPUs in the network processing device.

DETAILED DESCRIPTION

Figure 1:
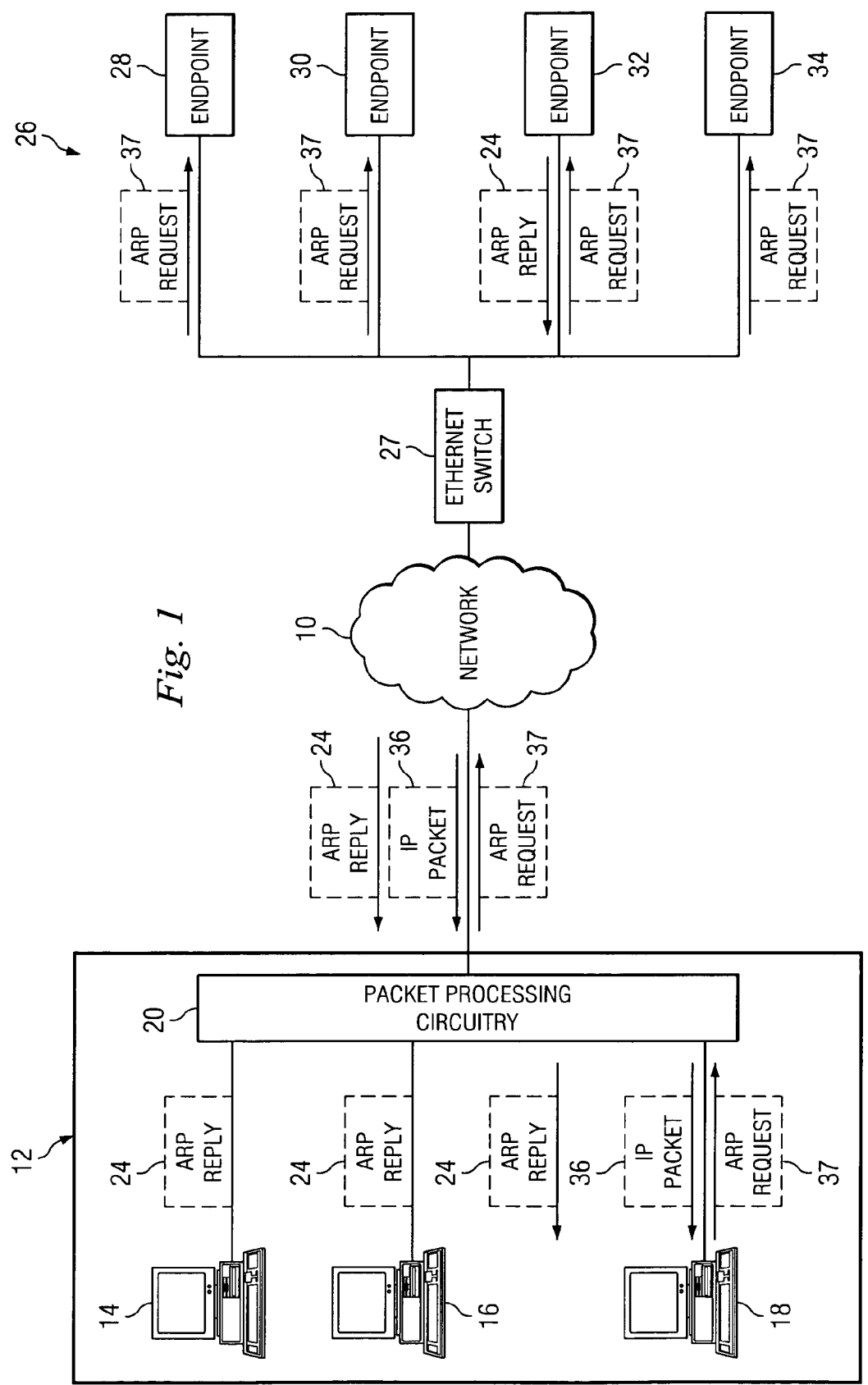
FIG. 1 is a block diagram of a network processing device that multicasts address resolution replies.

FIG. 1 shows a network processing device 12 that makes up part of a network 10. The network processing device 12 includes multiple Central Processing Units (CPUs) 14, 16, and 18 that each provide one or more control functions or applications for routing packets or communicating with other network processing devices in network 10. Each of the CPUs 14, 16, and 18 are coupled through packet processing circuitry 20 and network 10 to an Ethernet network 26. The Ethernet network 26 includes an Ethernet switch 27 that connects multiple endpoints 28, 30, 32, and 34 to the network 10. The endpoints 28, 30, 32, and 34 can be any Personal Computer (PC), server, switch, router, or other computing device.

One or more IP packets 36 are received by the packet processing circuitry 20 in network processing device 12. The IP packet 36 is generated by one of the CPUs 14, 16, or 18 or sent to one of the CPUs to be forwarded. In this example, the IP packet 36 is processed by CPU 18. The IP packet 36 has an associated IP destination address. The CPU 18 determines that a MAC address is needed to route the packet to the correct endpoint, however, the CPU 18 does not know the MAC address. The CPU 18 only knows what output port to send the packet.

To identify the correct MAC address, the CPU 18 broadcasts an Address Resolution Protocol (ARP) request 37 out over network 10. The ARP request 37 contains the destination IP address. The ARP request 37 is received by Ethernet switch 27 which then broadcasts the ARP request 37 to all of the endpoints 28, 30, 32, and 34 in the Ethernet network 26.

The endpoints 28, 30, 32, and 34 not associated with the destination IP address in the ARP request 37 do not answer the ARP request 37. In this example, the destination address is associated with endpoint 32. Accordingly, endpoint 32 answers the ARP request 37 by sending back an ARP reply 24. The ARP reply 24 contains the MAC address for endpoint 32.

The ARP reply 24 is received by the packet processing circuitry 20 in network processing device 12. The packet processing circuitry 20 is programmed to identify ARP replies. Instead of sending the ARP reply 24 only to the CPU 18 that initiated the ARP request 37, the packet processing circuitry 20 multicasts the ARP reply 24 to all CPUs 14, 16, and 18 in the network processing device 12. The ARP reply 24 is multicast by attaching a group egress node Id header to the ARP reply 24. Each CPU 14, 16, and 18 receives the ARP reply 24 in parallel. Each CPU then adds the MAC address in the ARP reply 24 to an address table (FIG. 3) that identifies the MAC address with the destination address in IP packet 36.

The next time an IP packet is received by any one of the CPUs 14, 16, or 18 to be forwarded or generated by the CPU that includes the same destination address, that CPU now has the associated MAC address for that destination address in its associated address table. Multicasting the ARP replies to multiple CPUs prevents each CPU 14, 16, and 18 from having to send out the same ARP request for the same IP address. This in turn reduces the number of ARP requests and ARP replies that are sent over the network and conserves network bandwidth and processing resources in the network processing device 12.

Figure 2:
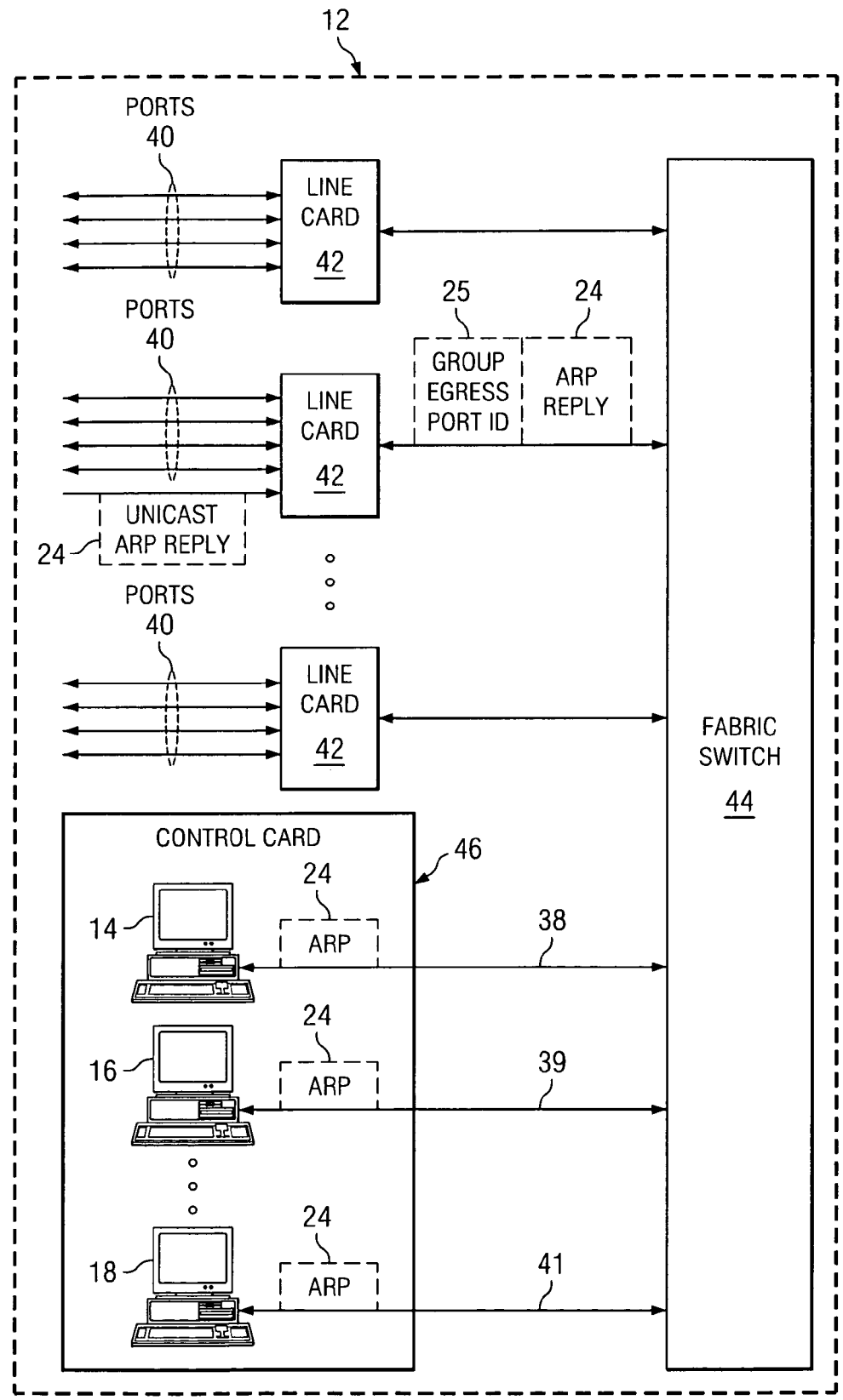
FIG. 2 is a more detailed block diagram of the network processing device shown in FIG. 1.

FIG. 2 is a more detailed diagram of the network processing device 12 shown in FIG. 1. The network processing device 12 includes multiple line cards 42 that each includes multiple ports 40. The ports 40 are connected to different communications and network lines, including, Ethernet lines, etc., that all form part of network 10 (FIG. 1). Packets received on the different ports 40 are transferred through a switch fabric 44 to other ports 40 according to the destination address in the packets.

A control card 46 receives certain control packets from the ports 40 that are used by the network processing device 12 to communicate with other devices in the network and to control how the received packets are processed. For example, Open Shortest Path First (OSPF) packets may be received on any one of the ports 40 and sent to the control card 46. To increase processing capacity, multiple CPUs 14, 16, and 18 are used in the control card 46. Each CPU 14, 16, and 18 may perform one or more of the same or different network applications. Any number of the CPUs 14, 16, and 18 may also operate as ARP managers. The ARP manager conducts the ARP communications, such as sending ARP requests and receiving ARP replies to determine the MAC addresses for particular IP packets.

Any one of the line cards 42 can receive ARP replies 24. The line card 42 converts the unicast ARP reply 24 into a multicast packet by adding a proprietary field 25 containing a group egress port Id. The line card 42 then sends the ARP reply 24 to the switch fabric 44. The switch fabric directs the ARP reply 24 to each output port identified by field 25. In this case, the group egress port Id 25 field identifies the egress ports 38, 39 and 41 coupled to CPUs 14, 16 and 18 respectively. Thus, the ARP reply 24 is multicast in parallel to the CPUs 14, 16 and 18 all at the same time.

Figure 3:
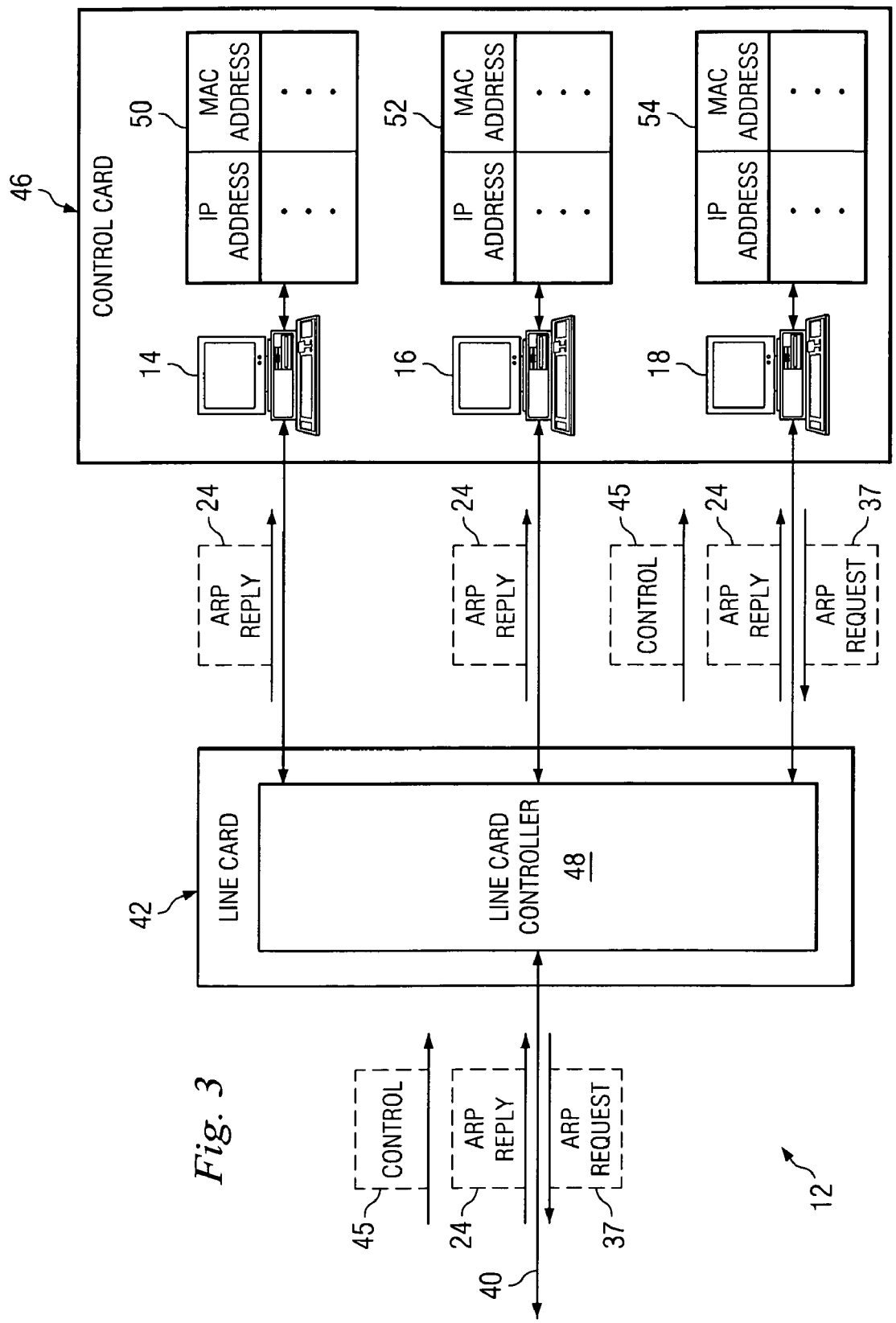
FIG. 3 shows a control card and a line card used in the network processing device shown in FIG. 1.

FIG. 3 shows in further detail one of the line cards 42 and the control card 46 used in the network processing device 12. The line card 42 includes a line card controller 48 that processes the data and control packets received over port 40. The CPUs 14, 16, and 18 each have associated address tables 50, 52, and 54 respectively. The address tables 50, 52 and 54 include IP addresses and associated MAC addresses.

In one example, a control packet 45 is received by the line card 42 and sent to CPU 18 to be forwarded (or the control packet is generated by the CPU itself). The CPU 18 requires the MAC address for a particular IP address in order to process the control packet 45. The CPU 18 first refers to its associated address table 54. If there is no MAC address in table 54 associated with the IP address, the CPU 18 sends out the ARP request 37.

Referring to FIGS. 3 and 4, the line card 42 receives packets to be forwarded (or the CPU generates the packet to be sent out) in block 56. If the packets are not ARP request packets, then line card sends the packets out to the network in block 58. If the line card 42 receives an ARP request packet from one of the CPUs 14, 16, or 18 in block 60, the line card controller 48 broadcasts the ARP request out to the network in block 62.

If an ARP reply is received back from the network in block 64, the line card controller 48 appends the group egress port Id to the ARP reply in block 66. The ARP reply is then multicast by the switch fabric to all of the CPUs 14, 16 and 18 in the control card in block 68. If no ARP reply is received back within some time period, a timeout is detected in block 63 and the line card controller returns to block 56. Each CPU 14, 16 and 18 separately reads the IP address and MAC address from the multicast ARP reply. Each CPU 14, 16, and 18 then separately updates their associated address tables 50, 52 and 54 with the IP address and associated MAC address in the multicast ARP reply.

The next time any one of the CPUs 14, 16, or 18 perform an operation that requires the MAC address for that particular IP address, that CPU can access the entry previously updated in its associated address table. Thus, only one ARP request and one ARP reply transaction is needed to update the address tables for all the multiple CPUs 14, 16 and 18 in control card 46.

This same multicasting scheme can be used for updating any control parameters that are used by multiple applications or CPUs in the network processing device. For example, the multicasting scheme may be used to update multiple routing tables that are each individually maintained by separate processing units in the network processing device.

The system described above can use dedicated processor systems, micro controllers, programmable logic devices, or microprocessors that perform some or all of the address resolution operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

Having described and illustrated the principles of the invention in a preferred embodiment thereof, it should be apparent that the invention may be modified in arrangement and detail without departing from such principles. Claim is made to all modifications and variation coming within the spirit and scope of the following claims.

The invention claimed is:

1. A network processing device, comprising:
   packet processing circuitry adapted to receive an address request from any one of multiple processors in the network processing device, the packet processing circuitry adapted to output the address request to a network and to receive an address reply to the address request; and
   the packet processing circuitry adapted to multicast the address reply to multiple ones of the processors at the same time.

2. A network processing device according to claim 1 wherein one or more of the multiple processors provide address resolution management that matches IP addresses with Media Access Control (MAC) addresses.

3. A network processing device according to claim 1 wherein the packet processing circuitry is located in a line card and the multiple CPUs are located in one or more control cards.

4. A network processing device according to claim 1 wherein the address request comprises an Address Resolution Protocol (ARP) request and the address reply comprises an Address Resolution Protocol (ARP) reply.

5. A network processing device according to claim 1 including address tables associated with each of the multiple processors, the processors in parallel each adding an IP address and associated Media Access Control address to the associated address tables received in the multicast address reply.

6. A network processing device according to claim 1 wherein the packet processing circuitry converts the address reply from one or more unicast packets to one or more multicast packets and sends the multicast packets to each of the processors at the same time.

7. A network processing device according to claim 1 including a switch fabric coupled between the packet processing circuitry and the processors, the switch fabric including separate egress ports for separately sending the same address reply to each one of the processors.

8. A method for updating addresses, comprising:
sending the packet out with the first address to another network device;
receiving an address request from one or more of the applications or processors for a second address associated with the first address;
sending the address request over a network;
receiving an address reply from the network identifying the second address associated with the first address; and
broadcasting the address reply to multiple ones of the applications or processors at the same time.

9. A method according to claim 8 including using an Address Resolution Protocol (ARP) to send the address request and receive the address reply.

10. A method according to claim 9 including broadcasting the ARP reply to the multiple applications or processors by designating the ARP reply packets as multicast packets.

11. A method according to claim 8 including individually updating address tables associated with each one of the applications or processors with the second address from the second address from the address reply.

12. A method according to claim 8 wherein the first address is an Internet Protocol address and the second address is a Media Access Control (MAC) address.

13. A method according to claim 8 including broadcasting the address reply from a line card in a network processing device to the multiple applications or processors in one or more control cards in the same network processing device.

14. A method according to claim 8 including receiving the packet with the first address from an IP network and sending the address request to endpoints in an Ethernet network.

15. A network processing device, comprising:
multiple processors for controlling operations in the network processing device; and
packet processing circuitry adapted to detect unicast control packets from a network and convert a detected unicast control packet into a multicast control packet that is relayed in parallel to the multiple processors at the same time.

16. A network processing device according to claim 15 wherein the control packets comprise address resolution protocol packets.

17. A network processing device according to claim 16 including multiple network interfaces each coupled to different ports and adapted to detect replies to address resolution requests and broadcast the detected replies to the multiple processors.

18. A network processing device according to claim 16 including address tables associated with each one of the multiple processors, the processors updating the associated address tables with an address contained in the address resolution protocol reply packets multicast from the packet processing circuitry.

19. A network processing device according to claim 15 including a switch fabric having individual egress ports coupled to each one of the multiple processors, each one of the egress ports sending control packets from the packet processing circuitry in parallel to the multiple processors at the same time.

* * * * *